(No Model.) 3 Sheets—Sheet 2.

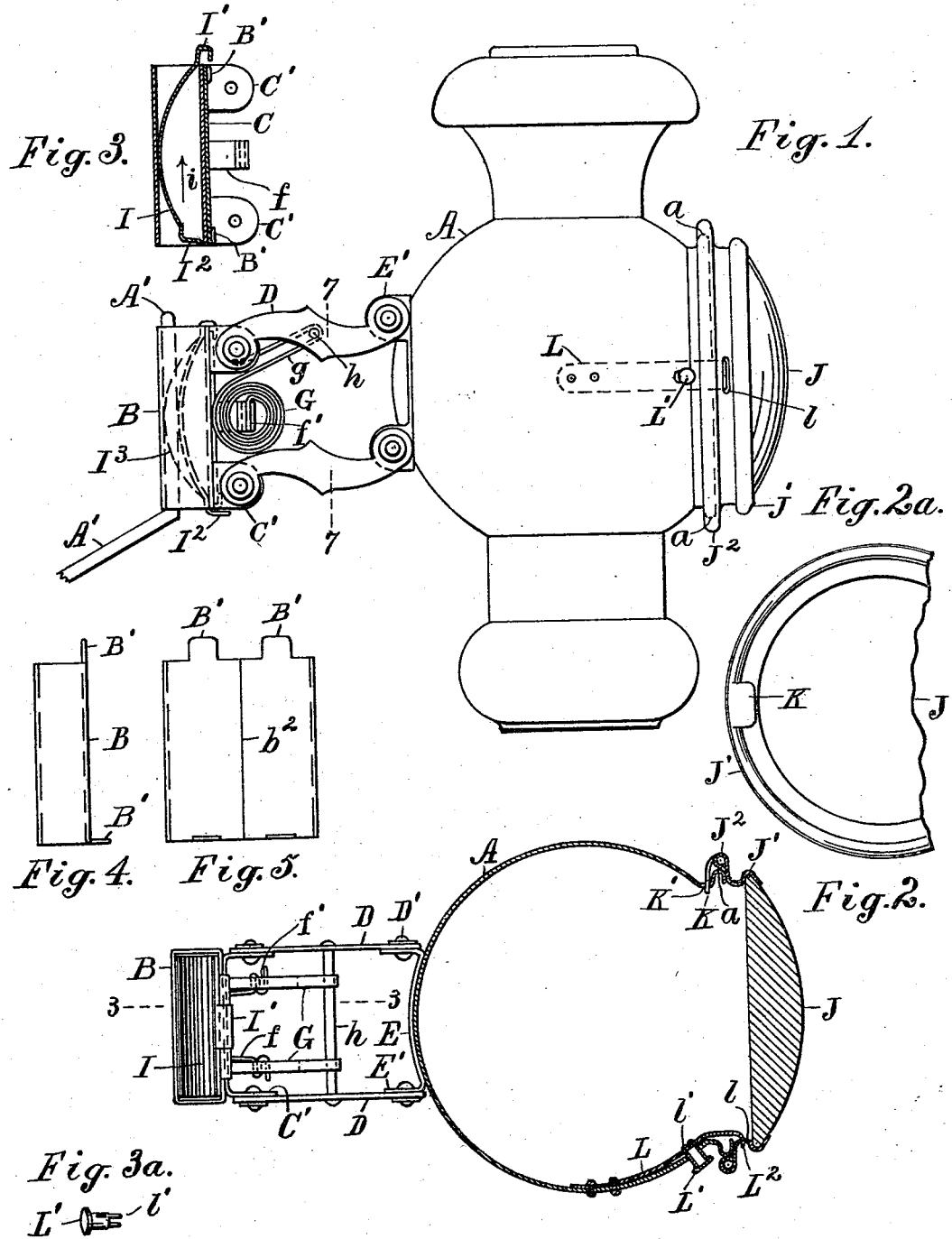

G. HAVELL.
SPRING BRACKET FOR BICYCLE LAMPS.

No. 579,677. Patented Mar. 30, 1897.

Attest:
L. Lee
Edw. F. Hinsey

Inventor.
George Havell, per
Thomas S. Crane, Atty.

(No Model.) 3 Sheets—Sheet 3.

G. HAVELL.
SPRING BRACKET FOR BICYCLE LAMPS.

No. 579,677. Patented Mar. 30, 1897.

Attest:
L. Lee.
Edw. F. Kinsey.

Inventor.
George Havell, per
Thomas S. Crane, Atty.

UNITED STATES PATENT OFFICE.

GEORGE HAVELL, OF NEWARK, NEW JERSEY, ASSIGNOR TO THE HAVELL MANUFACTURING COMPANY, OF SAME PLACE.

SPRING-BRACKET FOR BICYCLE-LAMPS.

SPECIFICATION forming part of Letters Patent No. 579,677, dated March 30, 1897.

Application filed August 26, 1896. Serial No. 603,925. (No model.)

*To all whom it may concern:*

Be it known that I, GEORGE HAVELL, a citizen of the United States, residing at Newark, Essex county, State of New Jersey, have invented certain new and useful Improvements in Spring-Brackets for Bicycle-Lamps, fully described and represented in the following specification and the accompanying drawings, forming a part of the same.

This invention relates partly to an improved construction for applying a clock-spring to the bracket of a bicycle-lamp to prevent excessive vibration of the latter and partly to the application of an elliptic spring detachably to the socket by which the lamp-bracket is mounted upon the supporting-arm.

The lamp-bracket shown herein includes, like others of the kind, a flat tubular socket which is fitted over the arm upon the bicycle-frame, parallel links attached thereto, and a plate joining the ends of the links for attachment to the back of the lamp. In the present construction the inner ends of two clock-springs are attached to the socket, and the outer ends are bent to embrace a tie-bar connecting the upper links. The links are joined to the socket by a foot-plate, and the latter is formed with arms projected from its inner surface and bent upon the ends to form laterally-open pockets to receive the inner ends of the clock-springs. The elliptic spring is formed with a hook to embrace the edge of the socket at the upper end and with a lateral ear at the bottom, fitted to hold the spring normally in the socket, while it is adapted to crowd within the socket when it is desired to remove the spring, which is sometimes necessary to restore its curvature when it has been flattened by accidental pressure. These improvements will be understood by reference to the annexed drawings, in which—

Figure 6:
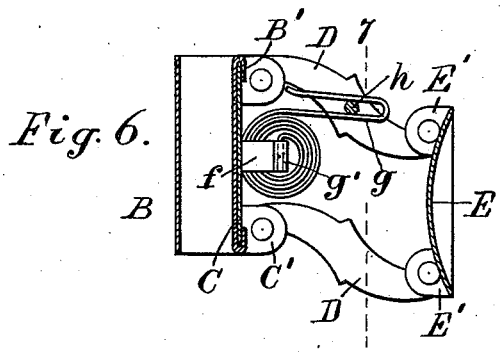
Figure 7:
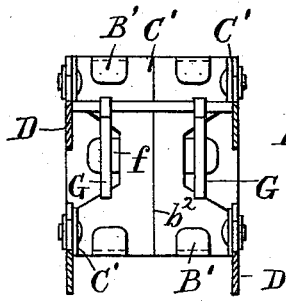
Figure 8:
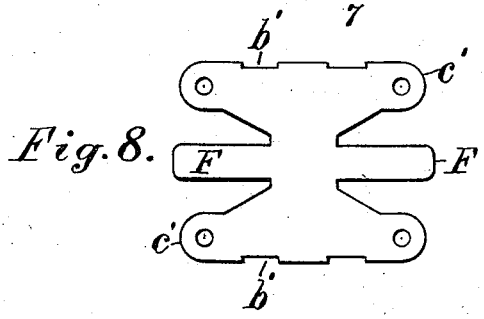
Figure 11:
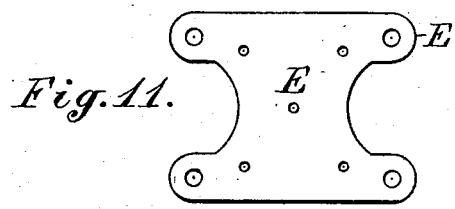
Figure 12:
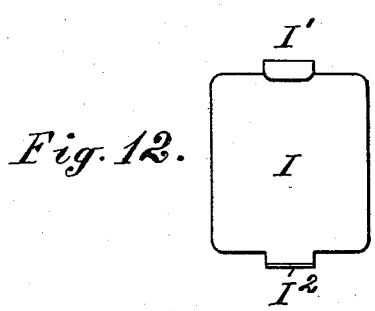
Figure 13:
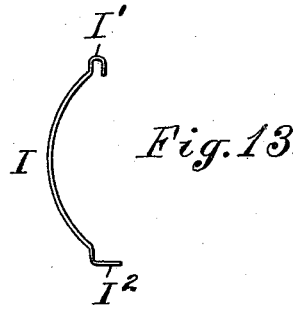
Figure 14:
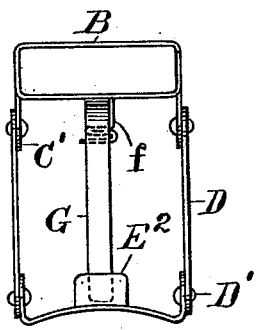
Figure 15:
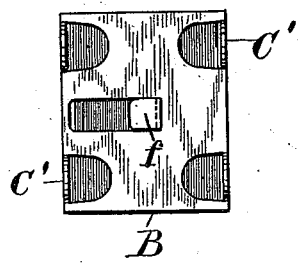

Figure 1 is a side elevation of a bicycle-lamp provided with the improvements. Fig. 2 is a plan, partly in section, of the same. Fig. 2ª shows part of the inner side of the lens and ring. Fig. 3 is a vertical section of the socket on line 3 3 in Fig. 2. Fig. 3ª is a perspective view of the spring-stud L'. Fig. 4 is an edge view of the socket, showing the lugs to embrace the foot-plate; and Fig. 5 is an inner view of the same, the lugs at the top being in their initial position and those at the bottom partially bent. Fig. 6 is a section of the spring-bracket on line 3 3 in Fig. 2. Fig. 7 is a transverse section on line 7 7 in Fig. 1. Fig. 8 shows the blank for the foot-plate, and Fig. 9 the same bent into final form. Fig. 10 is an end view of the same. Fig. 11 shows the blank for the tie-plate which connects the link to the lamp-body. Fig. 12 is an inside view, and Fig. 13 an edge view, of the elliptic spring. Fig. 14 is a plan of the spring-bracket constructed with a single spring; and Fig. 15 is a view of the socket upon the inner side, showing the single arm attached thereto and adapted to support the inner end of the single spring.

I will first describe the spring-bracket having two springs, as shown in Figs. 2 to 10, inclusive.

A designates the lamp-body; B, the socket; C, the foot-plate provided with four hinge-lugs C', to which the links D are jointed by rivets D'.

E designates the tie-plate, formed with four hinge-lugs E' to connect the links with the lamp-body A.

Figure 9:
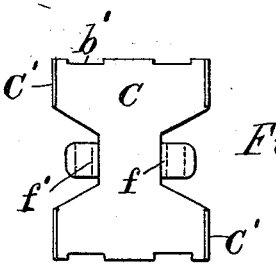
Figure 10:
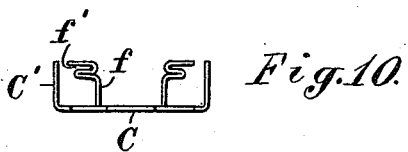

The socket is formed upon each of its upper and lower edges, as shown in Figs. 4 and 5, with two lugs B', and the foot-plate, as shown in Fig. 9, is formed with notches b' in its upper and lower edges, through which the lugs B' are extended and then bent down upon the face of the foot-plate, as shown in Fig. 3.

The blank for the foot-plate is provided at the corners with four ears c' to form the lugs C', and an indentation is formed in the middle of each side, from which lugs F are extended to form the arms f, which are reversely bent upon their outer ends, as shown in Fig. 2, to produce pockets f'.

The clock-springs G have their inner ends bent transversely across the spring and are fitted snugly within the pockets f', where they are secured by solder or by pressing the sides of the pocket together. By recessing the sides of the foot-plate the arms f are brought within the edges of the plate when bent outwardly, as shown in Fig. 10, and by forming reverse bends upon the ends of the arms the pockets are open toward the edges of the foot-plate, thus greatly facilitating the introduction of the spring end to the pocket and the application of solder to the mouth of the pocket, if desired.

By forming a lateral bend upon the arms $f$ prior to the formation of the pocket the pocket is extended laterally from the arm, and the arm thus clears the coils of the spring, as is fully shown in Fig. 2. The outer coil of the spring is terminated by a straight leaf $g$, which is extended under a tie-bar $h$, connecting the upper links, and is looped over such tie-bar and extended toward the foot-plate, so as to form a slotted connection to embrace the tie-bar in all positions of the links.

In Fig. 1 the springs are shown holding the outer ends of the links a little higher than their inner ends, in which position of the links the loops of the springs are arranged to contact with the tie-bar, so that an upward movement of the links pulls the coils of the spring upwardly.

Fig. 6 shows the outer ends of the links depressed and the loops of the springs slipped outwardly beneath the tie-bar $h$, such depression being resisted by the torsion of the coils.

The pull upon the loops resists the upward movement of the lamp, and thus restrains its upward vibrations, while the mere tension of the coils restrains the vibrations in the opposite direction.

Figs. 14 and 15 show the bracket provided with only one of the springs G, the latter being arranged midway between the links D. The hinge-lugs for the links are formed integral with the socket as well as the arm $f$.

The tie-plate E is shown in Fig. 14 provided at the middle with a projecting lug $E^2$, and the outer end of the single spring G is shown fitted to the lower side of such lug to press the same upwardly, and thereby balance the lamp to which it is attached. This construction produces substantially the same effect as where the spring is applied to the tie-bar $h$ upon the links.

I designates the leaf-spring for holding the socket by elastic frictional pressure upon the arm A, as shown in Fig. 1, which is commonly employed in bicycles to engage the socket. The spring is curved between its ends to press upon the arm, and when the arm is withdrawn from the socket the spring would press to the opposite side of the socket, as indicated by the dotted line $I^3$. The spring is held securely but removably within the socket by the vertical hook $I'$ at its upper end, which embraces the upper edge of the socket, and by the transverse ear $I^2$ at the lower end, which resists the longitudinal movement and escape of the spring from the socket by engagement of the lower edge of the socket.

When the elasticity or curvature of the spring is impaired by use, as is liable to happen with any spring metal, the transverse ear $I^2$ is crowded into the socket by sufficiently bending the same, as shown in Fig. 3, after which it may be slipped endwise through the socket in the direction of the arrow $i$, and when removed from the socket bent again into the proper curvature. By inserting the end of the spring having the transverse ear first into the socket it may be pushed downward within the same into its normal position, (shown in Fig. 1,) where the normal curvature serves to hold it securely in place. With such construction of the spring it may be bent to its final form before it is inserted in the socket, and is held therein by its normal pressure without any alteration or fastenings. The spring may thus be entirely completed before it is applied to the socket and safely secured therein without any expense whatever, while the same constructive features adapt it to be withdrawn from the socket and replaced therein when required without breaking or removing any fastenings. The elasticity of the spring may thus be readily restored at any time, which cannot be done where the spring is permanently fastened in the socket by rivets or solder.

It will be noticed by reference to Figs. 6 to 9, inclusive, that the notches $b'$ in the edges of the foot-plate admit the lugs B', so that the latter when bent down upon the face of the foot-plate, as shown in Figs. 6 and 7, secure the foot-plate rigidly from movement in every direction without the use of rivets or solder. The socket B is readily formed with the lugs B' of one piece of sheet metal folded to form a rectangular tube with the joint upon the inner side at the line $b^2$ in Figs. 5 and 7, the engagement of the lugs B' in the notches $b'$ serving to hold the joint permanently closed.

The formation of the foot-plate with the integral arms $f$ bent to form the pockets $f'$ secures the attachment of the clock-springs to the foot-plate without any auxiliary fastenings, and the whole device is thus formed of very few parts and secured together with the least possible labor.

All the parts are readily stamped from sheet metal by the use of suitable dies and are then bent by other dies into the finished shape required, so that the whole structure can be manufactured with the utmost cheapness.

To secure the lens J detachably upon the body A, the body is formed with a bead $a$, and the lens-ring $J'$ is provided upon its edge with a bead $J^2$, which forms an annular socket fitted to the exterior of the bead $a$. One side of the lens-ring, as shown in Fig. 2ᵃ, is provided with an inwardly-projecting lug K, fitted, as shown in Fig. 2, to a slot $K'$ in the body adjacent to the bead $a$.

The opposite side of the lens-ring is shown in Figs. 1 and 2 with a slot $l$, and a spring L is riveted upon the interior of the body and provided with a hooked end $L^2$ to engage such slot. A stud $L'$ is extended through the body and attached to the spring L to press the same inwardly to detach the hooked end of the spring from the lens-ring, which is then readily removed by tipping one side outwardly and slipping the lug K from the slot K'.

When replaced upon the bead $a$ with the lug K in the slot K', the lens-ring may be readily snapped down into its position, as it operates to press the hooked end of the spring inwardly. The stud L' is cheaply formed of a tubular rivet with two tongues $l'$ upon its inner ends, as shown in Fig. 3$^a$, such tongues being inserted through two small holes in the spring L and bent over upon the inner side of the same, as shown in Fig. 2. The outer end of the stud is formed, as shown in Fig. 2, with a collar or head to limit the inward movement of the stud and thus protect the spring from any unnecessary degree of flexure.

The jarring of the lens when the lamp is in use is sustained entirely by the bead $a$, and the spring L is thus enabled to retain the lens securely upon the lamp.

I hereby disclaim the subject-matter of the application, Serial No. 599,598, filed by me July 18, 1896, jointly with A. H. Meyer, as claim is made therein to the combination, with the socket of the lamp-bracket, of an elliptic spring secured within the socket by projections at its opposite ends.

Having thus set forth the nature of the invention, what is claimed herein is—

1. A spring-bracket for bicycle-lamps, having a socket adapted for connection with the bicycle, such bracket comprising the said socket and the tie-plate E provided each with lugs and having the links D jointed thereto, and the socket being provided with one or more arms $f$ having each a pocket at the end, and one or more clock-springs having each its inner end secured in said pocket and its outer end applied to raise the tie-plate, substantially as herein set forth.

2. The spring-bracket for bicycle-lamps, comprising the socket B and tie-plate E provided each with lugs and having the links D jointed thereto, the tie-bar $h$ connecting one pair of links, the arms $f$ attached to the socket between its edges and bent to form pockets $f'$ upon their outer sides, as set forth, and the clock-springs G having their outer ends applied to the tie-bar $h$, and their inner ends secured in the pockets $f'$ with the coils of the springs at the side of the arms $f$, as and for the purpose set forth.

3. The spring-bracket for bicycle-lamps, comprising a tubular sheet-metal socket B having the lugs B' upon its upper and lower edges, a foot-plate fitted to the inner side of the socket and secured thereon by bending the said lugs over upon its inner face, links suitably jointed to such foot-plate and a clock-spring mounted thereon with its outer end applied to the links to press the same normally upward, substantially as herein set forth.

4. The spring-bracket for bicycle-lamps, comprising the socket B formed with lugs B', the foot-plate C formed with notches $b'$ and secured to the socket by the lugs B', as set forth, the hinge-lugs C' and arms $f$ projected from the foot-plate, and the arms $f$ bent to form pockets, as set forth, links jointed to the lugs C', a tie-bar between two of the links, and clock-springs having their inner ends secured to the pockets and their outer ends applied to the tie-bar, as and for the purpose set forth.

5. The spring-bracket for bicycle-lamps, comprising the socket B and tie-plate E provided each with lugs and having the links D jointed thereto, the tie-bar $h$ connecting one pair of links, the arm $f$ projected inward from the socket and bent to form pocket $f'$, and the clock-spring G having its inner end secured in such pocket and its outer end looped over such tie-bar to form a slotted connection therewith, and embrace the tie-bar in different positions of the links, substantially as herein set forth.

6. A blank for a foot-plate for a spring-bracket for bicycle-lamps, shaped substantially as shown in Fig. 8, with ears $c'$ upon the corners adapted when bent to form hinge-lugs C', and having notches $b'$ in the upper and lower edges adapted to receive lugs upon the bracket-socket, and an indentation formed in the middle of each side, with lugs F extended therefrom and adapted, when bent to form supports for clock-springs, substantially as herein set forth.

7. A foot-plate for attachment to the socket of a spring-bracket for bicycle-lamps, and provided at the corners with the bent hinge-lugs C' and having indentations in the middle of each side with the arms $f$ projected upwardly therefrom, and reversely bent in opposite directions to produce pockets $f'$ open toward the edges of the foot-plate, the lugs C' being adapted to receive the links of the bracket, and the pockets $f'$ being adapted to receive the coil of a clock-spring to operate upon said links, as and for the purpose set forth.

8. In a spring-bracket for bicycle-lamps, the combination, with the flat tubular socket B, of an elliptic spring secured within the socket by projections at its opposite ends adapted to engage the ends of the socket upon one side and to retain it automatically within the socket, and to permit its removal therefrom and reinsertion therein, as and for the purpose set forth.

9. In a spring-bracket for bicycle-lamps, the combination, with the flat tubular socket B, of the detachable elliptic spring I provided at one end with the vertical hook I' adapted to embrace one edge of the socket and at the other end with the transverse ear I$^2$ adapted normally to engage the opposite end of the socket, and to be crowded through the socket, when required, to remove the spring for recurving, substantially as herein set forth.

10. The combination, with a bicycle-lamp body having upon the front the annular bead $a$, of the lens-ring formed with socket to fit the bead, with tongue K adapted to engage the body behind the bead, and with the slot $l$, as set forth, and the spring L attached to the lamp-body and provided with an end to engage the slot $l$, as and for the purpose set forth.

11. The combination, with a bicycle-lamp body having upon the front the annular bead $a$, with slot K' formed behind the bead, the lens-ring formed with socket to fit the bead, and provided with the tongue K to fit the slot K', and upon the opposite side with the slot $l$, as set forth, and the leaf-spring L secured at one end within the body and provided at the outer end with the hook $L^2$ to engage the slot $l$, and the tubular stud L' provided with tongues $l'$ for attachment to the spring, and formed with a head upon its outer end to limit the flexure of the spring, substantially as herein set forth.

In testimony whereof I have hereunto set my hand in the presence of two subscribing witnesses.

GEORGE HAVELL.

Witnesses:
J. D. CLARK,
THOMAS S. CRANE.